(12) United States Patent
Büschenfeld et al.

(10) Patent No.: US 10,248,132 B2
(45) Date of Patent: Apr. 2, 2019

(54) METHOD AND APPARATUS FOR VISUALIZATION OF AN ENVIRONMENT OF A MOTOR VEHICLE

(71) Applicant: Volkswagen Aktiengesellschaft, Wolfsburg (DE)

(72) Inventors: Torsten Büschenfeld, Uetze (DE); Stephan Max, Gifhorn (DE); Stefan Brosig, Hankesbüttel (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 15/616,056

(22) Filed: Jun. 7, 2017

(65) Prior Publication Data

US 2017/0357271 A1 Dec. 14, 2017

(30) Foreign Application Priority Data

Jun. 8, 2016 (DE) .................. 10 2016 210 088

(51) Int. Cl.
*G05D 1/02* (2006.01)
*B60R 1/00* (2006.01)

(52) U.S. Cl.
CPC ............. *G05D 1/0253* (2013.01); *B60R 1/00* (2013.01); *B60R 2300/105* (2013.01); (Continued)

(58) Field of Classification Search
CPC .................................. B60R 1/00; G05D 1/0253
See application file for complete search history.

(56) References Cited

U.S. PATENT DOCUMENTS 6,692,428 B1* 2/2004 Kania ............... A61M 21/0094
600/27
6,741,165 B1* 5/2004 Langfahl ............. B60R 25/1004
307/10.2
(Continued)

FOREIGN PATENT DOCUMENTS

DE 102006009566 A1 9/2007
DE 102008034606 A1 1/2010
(Continued)

OTHER PUBLICATIONS

Korean Office Action, Patent Application No. 10-2017-0069015, 7 pages, dated Oct. 22, 2018.

*Primary Examiner* — Alex C Dunn
(74) *Attorney, Agent, or Firm* — Slayden Grubert Beard PLLC

(57) ABSTRACT

The invention relates to a method and an apparatus for visualizing an environment of a motor vehicle, wherein the apparatus has at least one camera for detecting an environment of the motor vehicle, at least one display unit, and an evaluation and control unit, which is designed to depict images of the environment on the display unit, depending on the pictures from the at least one camera, wherein the apparatus comprises a device for detecting a head position of a vehicle passenger, wherein the evaluation and control unit is designed so that the depiction on the display unit is adapted depending on the detected head position, so that the vehicle passenger sees a depiction of the environment of the motor vehicle that the vehicle passenger would see if the display unit were a transparent window of the motor vehicle.

6 Claims, 2 Drawing Sheets

(52) U.S. Cl.
CPC ..... *B60R 2300/20* (2013.01); *B60R 2300/202* (2013.01); *B60R 2300/406* (2013.01); *B60R 2300/605* (2013.01); *B60R 2300/8006* (2013.01); *B60R 2300/8026* (2013.01); *B60R 2300/8086* (2013.01)

(56) References Cited

U.S. PATENT DOCUMENTS

| | | | |
|---|---|---|---|
| 7,100,190 B2* | 8/2006 | Johnson | H04N 7/17318 348/148 |
| 7,209,221 B2* | 4/2007 | Breed | B60N 2/002 356/28 |
| 7,605,773 B2* | 10/2009 | Janssen | B60K 35/00 345/156 |
| 8,049,609 B2* | 11/2011 | Takahashi | B60K 35/00 340/435 |
| 9,201,842 B2* | 12/2015 | Plante | G07C 5/008 |
| 9,402,162 B1* | 7/2016 | Liao | H04W 4/029 |
| 9,701,265 B2* | 7/2017 | Breed | B60R 16/037 |
| 9,728,228 B2* | 8/2017 | Palmer | G11B 27/105 |
| 9,738,224 B2* | 8/2017 | Gieseke | G06F 3/005 |
| 9,942,526 B2* | 4/2018 | Plante | G07C 5/008 |
| 9,996,754 B2* | 6/2018 | Brauer | B64D 11/0015 |
| 2006/0079729 A1 | 4/2006 | Kim | |
| 2010/0049393 A1* | 2/2010 | Emam | G08G 1/161 701/31.4 |
| 2014/0125583 A1 | 5/2014 | Aoki et al. | 345/156 |
| 2014/0336876 A1* | 11/2014 | Gieseke | G06F 3/005 701/36 |
| 2015/0363656 A1* | 12/2015 | Brauer | B64D 11/0015 348/77 |
| 2016/0137126 A1* | 5/2016 | Fursich | B60R 1/00 348/38 |
| 2016/0137129 A1* | 5/2016 | Mawhinney | B60R 1/006 348/148 |
| 2016/0200254 A1* | 7/2016 | Raab | B60R 1/00 348/148 |
| 2016/0297362 A1* | 10/2016 | Tijerina | H04N 7/181 |
| 2017/0129405 A1* | 5/2017 | Oba | B60R 1/00 |
| 2017/0169612 A1* | 6/2017 | Cashen | G06F 3/013 |
| 2017/0297496 A1* | 10/2017 | Onaka | H04N 5/23293 |
| 2017/0368994 A1* | 12/2017 | Gieseke | G06F 3/005 |
| 2018/0134217 A1* | 5/2018 | Peterson | B60R 1/06 |

FOREIGN PATENT DOCUMENTS

| | | | |
|---|---|---|---|
| DE | 102008059269 A1 | 6/2010 | |
| DE | 102011102744 A1 | 11/2012 | |
| DE | 102012214988 A1 | 4/2013 | |
| DE | 102011121616 A1 | 6/2013 | |
| GB | 2397189 A | 7/2004 | |
| JP | 2011-240813 A | 12/2011 | ............ B60K 35/00 |
| JP | 2014-094647 A | 5/2014 | ............ B60K 35/00 |

* cited by examiner ary claim. Advantageous refinements of the invention arise from the dependent claims, the description and the figures.

METHOD AND APPARATUS FOR VISUALIZATION OF AN ENVIRONMENT OF A MOTOR VEHICLE

CROSS-REFERENCE TO RELATED APPLICATIONS

This application claims the benefit of German Patent Application DE 10 2016 210 088.2, filed on Jun. 8, 2016 with the German Patent and Trademark Office. The contents of the aforesaid German Patent Application is incorporated herein in its entirety for all purposes.

BACKGROUND

The invention relates to a method and an apparatus for visualization of an environment of a motor vehicle.

Modern motor vehicles have a plurality of differently designed driver assistance systems. These can for example be designed as park assists, pedestrian protection systems, blind spot assists, or emergency brake assists. Typically at least one detection apparatus is provided, which detects environmental information of the motor vehicle. The detection apparatuses representing a motor vehicle environment sensor system are for example designed as ultrasonic sensors, radar sensors, lidar sensors or optical sensors. The at least one provided detection apparatus is operationally connected to a control unit by means of which the detected environmental information can be evaluated. In particular, corresponding software can be provided, which enables image recognition so that objects in particular within the environment of the motor vehicle can be detected and identified. This makes it possible to evaluate a driving situation of the motor vehicle, which in particular includes the early detection of an existing collision hazard.

With park assist, an area behind the motor vehicle is in particular detected optically. Using the detected environmental information, adjustments are automatically adapted using the control unit, in particular to change a yaw angle of the motor vehicle. To inform a motor vehicle driver, the environmental information describing the area behind the motor vehicle is displayed on a central display apparatus, which in particular can be integrated in an instrument panel of the motor vehicle.

A method is known from DE 10 2011 121 616 A1 in which at least one detection direction of a detection apparatus used to determine an environmental information, or a direction describing a direction information toward an object described by the environmental information starting from a reference point, in particular a sitting position of a driver within the motor vehicle, is assigned to the environmental information, wherein the at least one display apparatus covering an angular range in a horizontal plane is controlled to depict the environmental information within a subrange of the angular range assigned to the direction information.

The display apparatus is arranged within the vehicle and at least partially surrounds the edge of a passenger cell. The environmental information is depicted on a display apparatus at a position corresponding to the subarea, so that the associated direction information can be detected very easily and intuitively by the driver. This is enabled by the extension of the display apparatus over the angular range in the horizontal plane. If for example a pending collision hazard is detected, which is approaching the motor vehicle from the direction with reference to the sitting position of the driver, the display apparatus is controlled in the subarea assigned to the direction information in order to display the hazard. The detection direction of the detection apparatus designed as an optical sensor or camera can be used in particular to determine the direction information. Alternatively, provision is made to detect the direction using the environmental information describing the environment of the motor vehicle, for example by means of image recognition. If for example the object described by the environmental information is on a collision course—defining the direction information—with the motor vehicle, the display apparatus is controlled so that the environment information is depicted in the subarea of the display apparatus assigned to the direction information.

Preferably, the subarea of the display apparatus is controlled so that the output relative to the sitting position of the driver corresponds to the direction toward the object described by the environmental information. The sitting position of the driver defines the reference point for the output on the display apparatus. In particular, the display apparatus must be controlled in a slightly different subarea if the sitting position of the driver changes. This can accordingly ensure that the environmental information is output corresponding to the correct direction in which the object is located with reference to the sitting position. The sitting position is for example detected using a sensor system which detect the seat settings, in particular with reference to a vehicle longitudinal and/or transverse axis. In addition, the tilt angle of a backrest is detected so that the sitting position of the driver can be determined as precisely as possible. Moreover, the sitting position of the driver can be detected using a camera arranged within the vehicle that continuously detects the sitting position of the driver during driving.

Preferably, the display apparatus is formed by a plurality of display elements arranged adjacent to each other. The display elements are in particular arranged on the side next to the vehicle window and/or in the area of a vehicle door, vehicle column, in particular an A, B, or C column. The arrangement of at least one display element in the area of the vehicle column makes it possible in particular for environmental information otherwise covered by the vehicle column to be displayed in the associated subarea. Accordingly, the image detected by the imaging apparatus can be displayed in particular in the area of the vehicle column, wherein the image corresponds to the detected area which corresponds to the area of the blind spot. The area of the blind spot that cannot be seen due to the vehicle column is accordingly displayed in the area of the vehicle column, and the vehicle is accordingly rendered figuratively transparent to the driver so that intersections in particular can be easily seen.

A method is disclosed in DE 10 2008 034 606 A1 for depicting the environment of a vehicle on a mobile unit, which wirelessly receives at least one image signal from the vehicle, wherein a depiction on the mobile unit is generated by the at least one image signal which contains at least one virtual plane arranged in perspective on which is shown at least one image, recorded with vehicle recording means, that comprises at least part of the vehicle environment.

SUMMARY

The invention is based on an object of providing a method for depicting an environment of a motor vehicle that enables improved depiction of the environment. Another technical object is the provision of a suitable apparatus.

The above objects are solved by a method having the features of the independent method claim and an apparatus having the features of the corresponding independent apparatus claim. Additional embodiments will become apparent from the dependent claims and the following description.

DETAILED DESCRIPTION OF EMBODIMENTS

According to one exemplary aspect, a method for visualizing an environment of a motor vehicle is executed using at least one camera for detecting an environment of the motor vehicle, at least one display unit, and an evaluation and control unit. Images of the environment are depicted on the display unit depending on the pictures provided by at least one camera. The images of the environment do not necessarily have to correspond to the pictures. Instead and in corresponding embodiments, an image can be composed of a previous picture and/or a plurality of pictures from one or more cameras. In addition, the data of the pictures in an embodiment may be converted by suitable transformation matrices. Moreover, in an embodiment, at least one device may be provided for detecting a head position of a vehicle passenger, wherein the depiction on the display unit is adapted depending on the detected head position so that the vehicle passenger sees a depiction of the environment of the motor vehicle that the vehicle passenger would see if the display unit were a transparent window of the motor vehicle.

The current aspect is based on the insight of the present inventors that the sitting position is insufficient as a reference point. In addition to the different height of the vehicle passengers, this is in particular relevant when the head position changes. Intuitively, the vehicle passenger anticipates a change in the depiction just as he would when looking out of the window. According to the current aspect, the fact is exploited that normally the field of vision is larger than the display unit so that the image of the environment remains the same even when the viewing direction changes as long as the head position remains the same (even nodding or rotating the head does not change the image; only a different part of the image is in focus). Consequently, the vehicle passenger receives an intuitive depiction of the vehicle environment that he would perceive if the motor vehicle were transparent like a window in the area of the display unit.

In one embodiment, the head position is detected by at least one internal vehicle camera that for example is used to detect a state of attention of a motor vehicle driver. However, the invention is not limited to the motor vehicle driver. Accordingly, for example, the invention can be used for a vehicle passenger in the back seat of the vehicle whose forward vision is blocked by a headrest. If a display unit is integrated in the headrest, it can also depict images which the passenger would see if the display unit were a transparent window through the headrest.

In principle and in these embodiments, all existing display units such as a central display and/or an instrument cluster can be used as the display unit.

In one embodiment, the display unit is a component of a mobile device such as a smart phone. Since the alignment, or respectively position, of the display unit can change continuously with reference to the head position, the position of the display unit is determined by an internal sensor system of the mobile device. Accordingly, one can look outside through the motor vehicle by using the display unit, wherein the environment can be scanned by a movement of the display unit. For example, the display unit is aligned parallel to the vehicle floor so that the vehicle environment below the vehicle is depicted. If the mobile device is then moved back and forth, the ground below the vehicle can be searched for objects, for example.

In another embodiment, pictures of the motor vehicle interior are taken with a camera of the mobile device, wherein the position of the display unit is determined by comparing the pictures with previously saved pictures of the interior. Since for example the precise position of a control element is known, the position toward the control element, and hence the position in space, can be determined from the picture of the control element by the camera.

In addition or alternatively, the vehicle passenger head position can be detected by the camera of the mobile device, wherein the position of the display unit can be deduced using the head position determined by the internal vehicle camera.

BRIEF DESCRIPTION OF THE DRAWINGS

The invention is explained in the following in more detail using a further exemplary embodiment. The figures show:

FIG. 1 schematically shows an apparatus 1 for depicting an environment of a motor vehicle 100. The apparatus 1 comprises a plurality of cameras 2 for detecting an environment of the motor vehicle 100. Moreover, the apparatus 1 comprises two display units 3 and 4, as well as two internal vehicle cameras 5 and 6. Finally, the apparatus 1 has an evaluation and control unit 7. The display unit 4 is arranged in a headrest 8. The display unit 3 is for example an instrument cluster.

Figure 1:
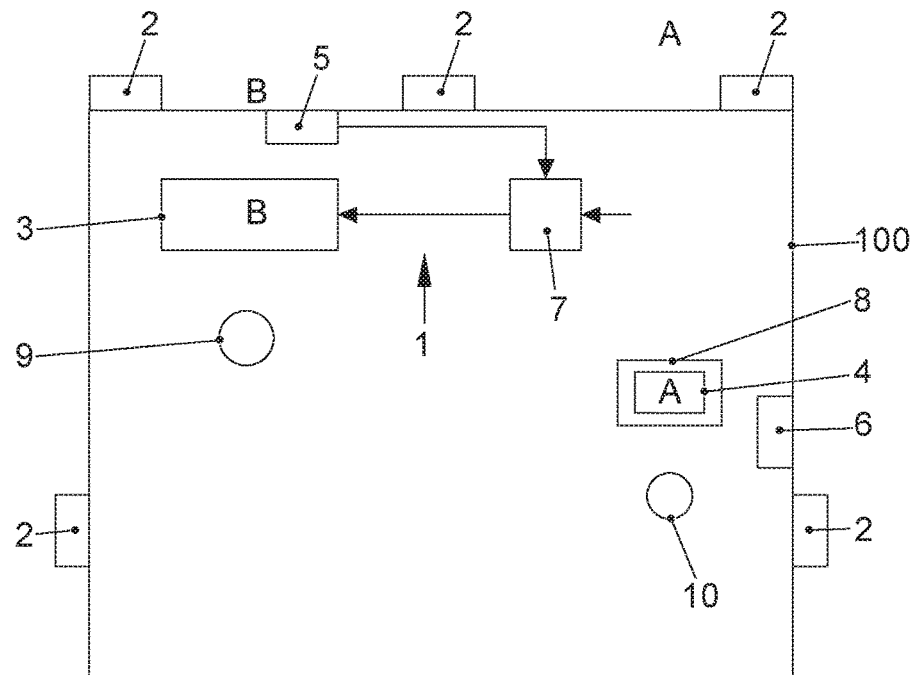
FIG. 1 a schematic representation of a device for depicting/visualizing an environment of a motor vehicle, FIG. 2 a schematic representation of a virtual field of vision, FIG. 3 another schematic representation of a device for depicting/visualizing an environment of a motor vehicle, FIG. 4a a schematic representation with a mobile device, FIG. 4b a schematic representation of the mobile device at a first point in time, and FIG. 4c a schematic representation of the mobile device at a second point in time.

Using the interior vehicle camera 5, a head position 9 of a motor vehicle driver is determined and sent to the evaluation and control unit 7. The evaluation and control unit 7 also discerns the position of the display unit 3. Accordingly, the evaluation and control unit 7 discerns the relative position, or respectively alignment between the head and display unit 3. The evaluation and control unit 7 then determines a virtual field of vision that the motor vehicle driver would have if the display unit were a transparent motor vehicle window. The evaluation and control unit 7 then prepares the pictures of the camera 2 (including pictures from past periods) such that an image of the vehicle environment is depicted on the display unit 3 that the motor vehicle driver would see if the display unit 3 were a transparent window. For example, the driver would see an object B located directly before the motor vehicle 100. The motor vehicle driver can then see this object B on the display unit 3. The data transmission by the camera 2 to the evaluation and control unit 7 may, in corresponding embodiments, be wireless or wired.

Correspondingly, the interior vehicle camera 6 determines the head position 10 of a vehicle passenger in the back seat of the motor vehicle 100 and determines its relative position, or respectively alignment to the display unit 4 (taking into account the adjusted height or headrest 8). The vehicle environment then is depicted on the display unit 4 that the vehicle passenger would see if the display unit 4 were a transparent window. For example, an object A that would otherwise be covered by the headrest 8 is depicted. The vehicle passenger therefore looks clearly through the headrest 8. In one example, the vehicle passenger can select the depiction of the vehicle environment by a selection menu and otherwise use the display unit 4 for other purposes. It may also be provided for the vehicle passenger to be able to change the depiction by being able to manually adjust the virtual field of vision.

Figure 2:
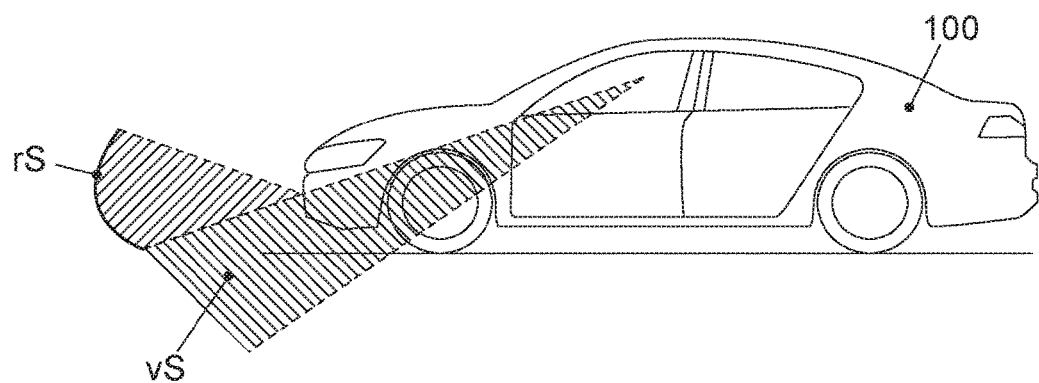

FIG. 2 schematically shows such a virtual field of vision vS for the display unit 3. The real field of vision rS of a camera 2 (for example of the middle, front camera 2 according to FIG. 1) is also shown. As can be seen in the FIG., the overlap between the virtual field of vision vS and the real field of vision rS is slight. However, the virtual field of vision vS can also be determined from previous pictures by camera 2.

Figure 3:
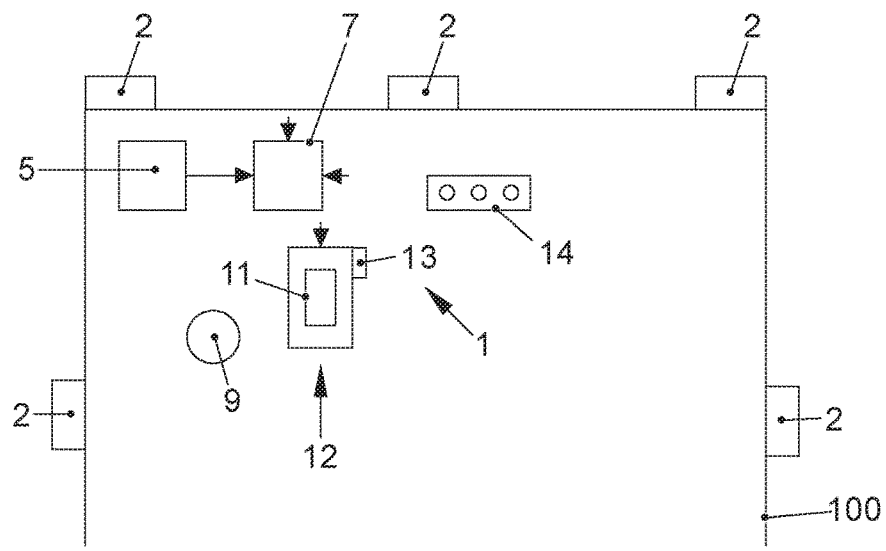

FIG. 3 depicts the apparatus 1 in an alternative embodiment, wherein it can also be entirely or partially combined with the apparatus 1 according to FIG. 1. The same elements refer to the same reference numerals. In contrast to FIG. 1, a display unit 11 is provided as a component of a mobile device 12. The mobile device 12 has a camera 13 and communicates wirelessly with the evaluation and control unit 7. Using the camera 13, the mobile device 12 detects either the head position 9 of the motor vehicle driver or an interior trim 14 of the motor vehicle 100. The position of the mobile device 12 and hence the relative location to the head position 9 is determined using the comparison with the determined head position 9 by means of the interior vehicle camera 5, or by comparing with previously saved position data of the interior trim 14. Accordingly, the display unit 11 is used as a virtual window for depicting the vehicle environment.

Figure 4A:
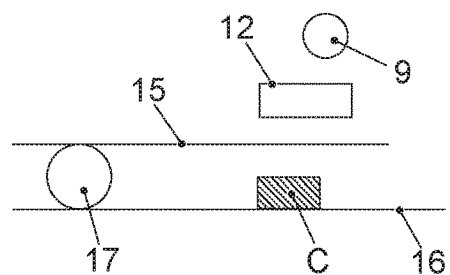
Figure 4B:
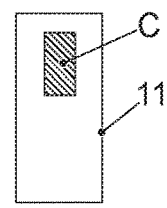
Figure 4C:
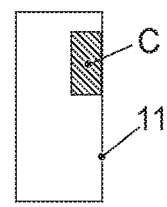

This will be briefly explained with reference to FIGS. 4a to 4c. The motor vehicle driver holds his mobile device 12 parallel to a vehicle floor 15. An object C is below the vehicle floor 15 on a street 16. The mobile device 12 then receives data from the evaluation and control unit 7 depending on the position of the mobile device 12 and the head position 9. The vehicle passenger then sees the object C on the display unit 11 as if he were looking through the motor vehicle with the display unit 11 (see FIG. 4b). If the motor vehicle driver then moves the mobile device to the left toward the interior vehicle wall, the depiction of the object C correspondingly moves to the right on the display unit 11 (see FIG. 4c). The vehicle passenger can scan the environment by moving the mobile device 12 and/or changing his head position. It should be noted that parts of the motor vehicle 100 (such as the wheels 17) can also be depicted on the display unit 11 for better orientation.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit may fulfill the functions of several items recited in the claims.

The mere fact that certain measures are recited in mutually different dependent claims or embodiments does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A method of visualizing an environment of a motor vehicle using at least one vehicle-installed camera for detecting an environment of the motor vehicle, at least one display unit, and an evaluation and control unit, which depicts images of the environment on the display unit in dependence of images from the at least one camera, wherein at least one device is provided for detecting a head position of a vehicle passenger, wherein the depiction on the display unit is adapted depending on the detected head position and the position of the display unit, so that the vehicle passenger sees a depiction of the environment of the motor vehicle that the vehicle passenger would see if the display unit were a transparent window of the motor vehicle, wherein the display unit is a component of a mobile device, wherein the position of the display unit is determined by an internal sensor system, wherein the mobile device acquires images of the interior with a camera of the mobile device, and the position of the display unit is determined by comparing the images with previously saved images of the interior.

2. The method according to claim 1, wherein the head position is detected by at least one vehicle passenger camera.

3. An apparatus of visualizing an environment of a motor vehicle, wherein the apparatus comprises at least one vehicle-installed camera for detecting an environment of the motor vehicle, at least one display unit, and an evaluation and control unit, which is designed to depict images of the environment on the display unit depending on images from the at least one camera, wherein the apparatus further comprises a device for detecting a head position of a vehicle passenger, wherein the evaluation and control unit is configured so that the depiction on the display unit is adapted depending on the detected head position, so that the vehicle passenger sees a depiction of the environment of the motor vehicle that the vehicle passenger would see if the display unit were a transparent window of the motor vehicle, wherein the at least one display unit is a component of a mobile device, wherein the mobile device is configured with an internal sensor system for detecting the position of the display unit, and wherein the mobile device comprises at least one camera, wherein the mobile device or the evaluation and control unit is configured so that the position of the display unit is determined from pictures of the camera of the interior of the motor vehicle and by comparing with previously saved pictures of the interior, or that the camera detects the head position of the vehicle passenger, wherein the position of the display unit is deduced from the determined head position by a vehicle passenger camera.

4. The apparatus according to claim 3, comprising at least one interior vehicle camera, which is configured to determine the head position of a vehicle passenger.

5. The method according to claim 1, wherein the mobile device detects the head position of the vehicle passenger with the camera of the mobile device, wherein the position of the display unit is deduced using the determined head position by a vehicle passenger camera.

6. A method of visualizing an environment of a motor vehicle using at least one vehicle-installed camera for detecting an environment of the motor vehicle, at least one display unit, and an evaluation and control unit, which depicts images of the environment on the display unit in dependence of images from the at least one camera,
> wherein at least one device is provided for detecting a head position of a vehicle passenger, wherein the depiction on the display unit is adapted depending on the detected head position and the position of the display unit, so that the vehicle passenger sees a depiction of the environment of the motor vehicle that the vehicle passenger would see if the display unit were a transparent window of the motor vehicle, wherein
> the display unit is a component of a mobile device, wherein the position of the display unit is determined by an internal sensor system, and wherein
> the mobile device detects the head position of the vehicle passenger with a camera of the mobile device, wherein the position of the display unit is deduced using the determined head position by a vehicle passenger camera.

\* \* \* \* \*